United States Patent
Samuel et al.

(10) Patent No.: US 8,653,011 B2
(45) Date of Patent: Feb. 18, 2014

(54) GELLED HYDROCARBON SYSTEM AND METHOD WITH DUAL-FUNCTION VISCOSIFIER/BREAKER ADDITIVE

(75) Inventors: Mathew M. Samuel, Sugar Land, TX (US); Leiming Li, Sugar Land, TX (US); Juliet Edwena Juel, Kuala Lumpur (MY)

(73) Assignee: Schlumberger Technology Corporation, Sugar Land, TX (US)

(*) Notice: Subject to any disclaimer, the term of this patent is extended or adjusted under 35 U.S.C. 154(b) by 167 days.

(21) Appl. No.: 12/616,972

(22) Filed: Nov. 12, 2009

(65) Prior Publication Data

US 2011/0111991 A1 May 12, 2011

(51) Int. Cl.
*C09K 8/66* (2006.01)

(52) U.S. Cl.
USPC ........... 507/248; 507/240; 507/244; 507/252; 507/263; 507/265; 507/256; 507/267; 507/269; 166/305.1

(58) Field of Classification Search
None
See application file for complete search history.

(56) References Cited

U.S. PATENT DOCUMENTS

| | | | |
|---|---|---|---|
| 2,966,401 A | 12/1960 | Myerholtz, Jr. | |
| 3,757,864 A | 9/1973 | Crawford et al. | |
| 4,466,893 A * | 8/1984 | Dill | 507/211 |
| 4,507,213 A | 3/1985 | Daccord et al. | |
| 4,515,220 A * | 5/1985 | Sizer et al. | 166/384 |
| 4,557,838 A * | 12/1985 | Nichols et al. | 507/242 |
| 4,622,155 A | 11/1986 | Harris et al. | |
| 4,647,480 A | 3/1987 | Ahmed | |
| 4,663,367 A * | 5/1987 | Navratil et al. | 523/130 |
| 4,705,107 A * | 11/1987 | Council et al. | 166/170 |
| 4,799,554 A * | 1/1989 | Clapp et al. | 166/312 |
| 4,877,894 A | 10/1989 | Huddleston | |
| 4,919,204 A * | 4/1990 | Baker et al. | 166/223 |
| 4,919,209 A | 4/1990 | King | |
| 5,110,485 A | 5/1992 | Huddleston | |
| 5,190,675 A | 3/1993 | Gross | |

(Continued)

FOREIGN PATENT DOCUMENTS

WO    WO 9856497 A1 * 12/1998

OTHER PUBLICATIONS

Association Colloids in Nonaqueous Fluids—Viscosity and Drag Reduciton Characteristics. Baker, H.R., Bolster, R.N., Leach, P.B., Little, R.C. Ind. Eng. Chem. Prod. Res. Develop., vol. 9, No. 4, 1970, pp. 541-548.

(Continued)

*Primary Examiner* — John J Figueroa
(74) *Attorney, Agent, or Firm* — Matthew Vandermolen; Daryl Wright; Tim Curington

(57) ABSTRACT

A gelled organic-based fluid system and method of forming and using the system. The fluid system is prepared by gelling an organic solvent, a viscoelastic surfactant, and a nitrogen compound having a free electron pair such as urea in an amount effective to both increase viscosity and increase a rate of breaking the viscosity, relative to the gelled system without the nitrogen compound. In a further aspect, the method is used to treat a well penetrating a subterranean formation, for example, in a coiled tubing cleanout, or the like.

27 Claims, 1 Drawing Sheet

(56) References Cited

U.S. PATENT DOCUMENTS

| | | | |
|---|---|---|---|
| 5,219,475 A * | 6/1993 | Lockhart et al. | 507/225 |
| 5,322,121 A * | 6/1994 | Hrachovy | 166/279 |
| 5,338,465 A * | 8/1994 | Lockhart et al. | 507/244 |
| 5,948,735 A * | 9/1999 | Newlove et al. | 507/238 |
| 5,964,295 A | 10/1999 | Brown et al. | |
| 5,979,557 A | 11/1999 | Card et al. | |
| 6,184,184 B1 | 2/2001 | Amin et al. | |
| 6,232,274 B1 | 5/2001 | Hughes et al. | |
| 6,239,183 B1 | 5/2001 | Farmer et al. | |
| 6,248,699 B1 | 6/2001 | Subramanian et al. | |
| 6,258,859 B1 | 7/2001 | Dahayanake et al. | |
| 6,435,277 B1 | 8/2002 | Qu et al. | |
| 6,506,710 B1 | 1/2003 | Hoey et al. | |
| 6,703,352 B2 | 3/2004 | Dahayanake et al. | |
| 6,849,581 B1 | 2/2005 | Thompson et al. | |
| 6,906,010 B2 * | 6/2005 | Hoy | 507/140 |
| 7,060,661 B2 | 6/2006 | Dobson, Sr. et al. | |
| 7,119,050 B2 | 10/2006 | Chang et al. | |
| 7,148,185 B2 | 12/2006 | Fu et al. | |
| 7,303,018 B2 | 12/2007 | Cawiezel et al. | |
| 7,510,009 B2 | 3/2009 | Cawiezel et al. | |
| 7,521,400 B2 | 4/2009 | Samuel | |
| 2008/0146466 A1 * | 6/2008 | Smith et al. | 507/265 |
| 2009/0305914 A1 | 12/2009 | Li et al. | |

OTHER PUBLICATIONS

SPE7564—Developments in Hydrocarbon Fluids for High-Temperature Fracturing. JPT Forum. Feb. 1980, Society of Petroleum Engineers of AIME.

SPE9007—Hydrocarbon Gels of Alumino Alkyl Acid Orthophosphates. McKenzie, L.F., Hughes, B.J. 1980, American Institute of Mining, Metallurgical and Petroleum Engineers Inc. Presented at the SPE Fifth International Symposium on Oilfield and Geothermal Chemistry, in Stanford, California, May 28-30, 1980.

SPE21586—Continuously Gelled Diesel Systems for Fracturing Applications. McCabe, M.A., Terracina, J.M., Kunzi. 1990 Society of Petroleum Engineers. Presented at The International Technical Meeting, hosted by the Petroleum Society of CIM and the Society of Petroleum Engineers in Calgary, Jun. 10-13, 1990.

SPE21859—An Improved Gelled Oil System for High-Temperature Fracturing Applications. Cramer, D.D., Dawson, J., Ouabdessem, M. 1991 Society of Petroleum Engineers, Inc. Presented at the Rocky Mountain Regional Meeting and Low-Permeability Reservoirs Symposium held in Denver, Colorado, Apr. 15-17, 1991.

SPE38622—Polymer-Free Fluid for Hydraulic Fracturing. Samuel, M., Card, R. J., Nelson, E.B., Brown, J.E., Vinod, P.S., Temple, H.L., Qu, Q., and Fu, D.K. 1997 Society of Petroleum Engineers, Inc. Presented at the 1997 SPE Annual Technical Conference and Exhibition held in San Antonio, Texas. Oct. 5-8, 1997.

* cited by examiner

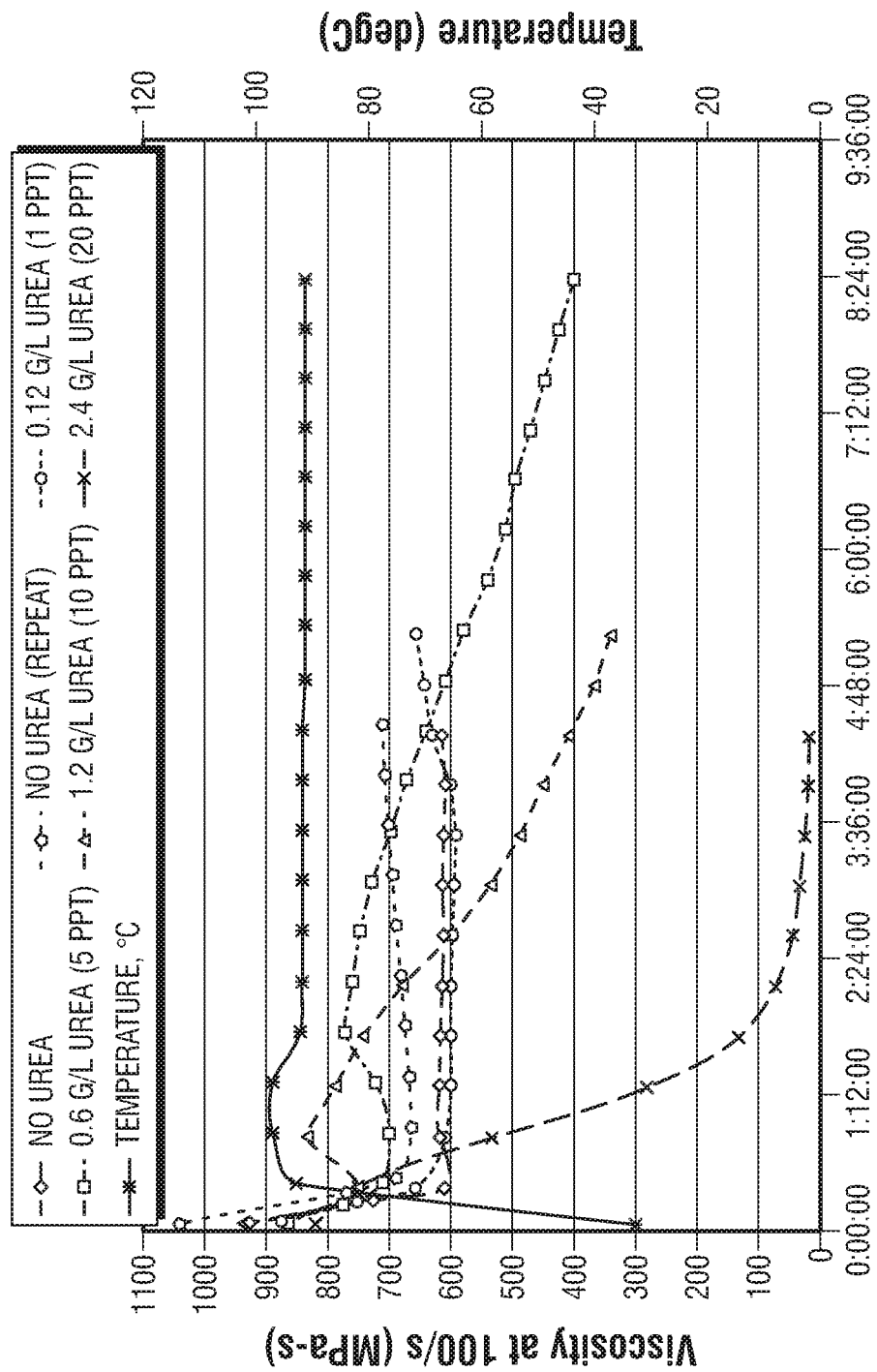

GELLED HYDROCARBON SYSTEM AND METHOD WITH DUAL-FUNCTION VISCOSIFIER/BREAKER ADDITIVE

FIELD OF THE INVENTION

This invention relates to compositions and methods for treating subterranean formations penetrated by well bores. More particularly, the invention relates to gelled hydrocarbon fluid systems and methods relating to rheological modifications.

BACKGROUND

The statements in this section merely provide background information related to the present disclosure and may not constitute prior art.

Gelled liquid hydrocarbon fluids have been utilized in a variety of treatments for subterranean formations penetrated by well bores, including stimulation activities such as fracturing, gravel packing, sand control and the like. Such hydrocarbon fluids must have a sufficiently high viscosity to generate a fracture of sufficient dimensions and also to carry the proppant particles to the wellbore and to the fracture. Oil-based treatment fluids, i.e., free of water or having an external organic phase, are used to treat formations having sensitivity to water or which may suffer permeability reduction or damage when exposed to aqueous fluids.

Ideally, in fracturing applications, additives are designed to provide high viscosity to the frac fluid at the time of pumping and lower the viscosity after the proppant is placed in the fracture by breaking the fluid. For water-base fluids, reducing agents and oxygen scavengers are often used as stabilizers to maximize the initial viscosity of the fluid. Oxidizing agents are generally used to break the fluid. As both the additives (stabilizers and breakers) are added together to the fluid, they compete with each other making each one less efficient. For example, live breakers can start breaking the fluid as soon as it is mixed in the fluid, and no delay in breaking is inherent in these systems. Thus, there is no single additive which helps with both boosting the initial viscosity and as a breaker at the end of pumping. Similar stabilization and breaking issues also exist for oil-base fracturing fluids.

Viscoelastic surfactants (VES) are known to boost the viscosity of hydrocarbon based gels from US20050233911 and U.S. Ser. No. 12/433,076. U.S. Ser. No. 12/433,076 also discloses that base precursors such as ureas and substituted ureas, cyanates, alkylamines and certain alkanolamines and quaternary ammonium salts, among others, can be used as encapsulated alkaline pH modifiers to cause emulsion destabilization. On the other hand, U.S. Pat. No. 6,232,274 discloses that urea, guanidine hydrochloride, urethane and the like are used to increase the viscosity of VES fluids in aqueous systems. In phosphate-gelled oil systems, U.S. Pat. No. 4,919,209 discloses sodium carbonate, sodium bicarbonate, sodium acetate, p-nitrobenzoic acid, triethanolamine, sodium acetate, sodium bicarbonate, calcium oxide, calcium hydroxide and the like are used as breakers at heavy loading. For delayed breaking in gelled oils, U.S. Pat. No. 5,948,735 discloses using particulated urea, metal hydroxides and carbonates encapsulated with oil-degradable materials, such as rubber.

A single additive that could be used as both a viscosity booster and breaker in the same system would greatly simplify oil-based gel preparation and use, among other advantages.

SUMMARY

Disclosed are gelled hydrocarbon fluids formed in an embodiment from a mixture of at least a hydrocarbon (e.g. diesel, kerosene, mineral spirits and crude oils), a gelling agent including a viscoelastic surfactant, such as zwitterionic surfactant (e.g., erucic amidopropyl dimethyl betaine, poly-alpha-olefin sulfonate), and a low molecular weight compound having a nitrogen moiety with a lone electron pair (e.g., urea) in an amount effective to both increase the initial viscosity and decrease the break time of the gelled hydrocarbon fluid, relative to a reference gelled hydrocarbon fluid prepared without the compound. Methods of making and using such fluids are disclosed as well. In some embodiments, the gelled hydrocarbon fluid can comprise an activator selected from metal sulfates, metal carboxylate (e.g., aluminum octoate) and the like. In some embodiments, the gelled hydrocarbon fluid may optionally comprise a gelling agent (e.g., an organic phosphate such as a phosphate ester) and/or an activator. A method of forming a gelled organic-based fluid is disclosed. The method comprises combining an organic solvent, a viscoelastic surfactant, a low molecular weight compound having a nitrogen moiety with a lone electron pair; and forming a gelled organic-based fluid.

In one embodiment, an organic-based fluid gel is prepared by a process comprising: forming a gellable organic-based fluid system comprising a viscoelastic surfactant; dissolving a nitrogen compound in the fluid system, wherein the nitrogen compound comprises a nitrogen moiety having a lone electron pair, wherein the nitrogen compound is present in the fluid system in an amount and a form effective to increase initial viscosity of the fluid system at 100/s and reduce break time of the fluid system, relative to the fluid system without the nitrogen compound; and gelling the fluid system, whereby the gelled fluid system has a greater viscosity at 100/s upon initial gel formation and is subject to breaking at a faster rate, relative to a similar fluid system sans the nitrogen compound. In one embodiment, the nitrogen compound has a molecular weight less than 250 Daltons.

In an embodiment, the gellable organic-based fluid system comprises an organic solvent selected from the group consisting of diesel oil, kerosene, paraffinic oil, crude oil, refined oil, gas condensates, liquefied petroleum gas (LPG), toluene, xylene, ethers, esters, mineral oil, biodiesel, vegetable oil, animal oil, alcohol, and mixtures thereof. In embodiments, the gellable organic-based fluid system comprises an organic solvent phase, which can be external, for example, in an invert emulsion or colloidal dispersion.

In an embodiment, the viscoelastic surfactant is selected from the group consisting of cationic surfactants, anionic surfactants, zwitterionic surfactants, amphoteric surfactants, nonionic surfactants and combinations thereof. In an embodiment, the viscoelastic surfactant comprises a quaternary amine having the formula:

$$RCONH(CH_2)_a(CH_2CH_2O_c)_m(CH_2)_b-N^+(CH_3)_2-(CH_2)_{a'}(CH_2CH_2O_d)_{m'}(CH_2)_{b'}COO^-$$

in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; c and d are independently 0 or 1 and when c or d are 1, $CH_2CH_2O$ may also be $OCH_2CH_2$. In one embodiment, the viscoelastic surfactant comprises a betaine compound selected from the group consisting of erucic amidopropyl dimethyl betaine, oleoylamidopropyl dimethyl betaine, cocamidopropyl betaine, and mixtures thereof. In one embodiment, the viscoelastic surfactant comprises an alpha-olefin sulfonate. In an embodiment, the viscoelastic surfactant is present in the gellable fluid system in a concentration range of from 0.02 to 2.0 volume percent.

In one embodiment, the nitrogen compound is selected from the group consisting of urea, thiourea, guanidine and derivatives and mixtures thereof. In an embodiment, the nitrogen compound is selected from the group consisting of primary, secondary and tertiary amines. In an embodiment, the nitrogen compound is selected from the group consisting of Lewis bases and salts thereof. In an embodiment, the nitrogen compound is free of quaternary ammonium moieties. In an embodiment, the nitrogen compound is dissolved in the fluid system at between 0.01 and 25 g/L, or between 0.05 and 10 g/L, e.g., between 0.1 and 5 g/L or between 0.6 and 2.4 g/L.

In an embodiment, the fluid system is gelled with a metal carboxylate crosslinker. In an embodiment, the metal carboxylate crosslinker is branched and each carboxylate branch has from about 6 to about 30 carbon atoms. In an embodiment, the metal carboxylate crosslinker is selected from the group consisting of: di-ester with the same branched carboxylic acid, tri-ester with the same branched carboxylic acid and mixtures thereof. In an embodiment, the metal carboxylate crosslinker is an aluminum carboxylate crosslinker. In an embodiment, the aluminum carboxylate crosslinker is selected from the group consisting of aluminum 2-ethylhexanoate, hydroxyaluminum bis(2-ethylhexanoate), and mixtures thereof.

In one embodiment, the gelled fluid system is free of any added phosphorus source. Phosphorus can be present in traces or naturally in other components used. However no intentional addition of phosphorus is made.

In another embodiment, the gellable fluid system comprises an organic phosphate and an activator. In an embodiment, the organic phosphate is selected from the group consisting of phosphate esters and the activator comprises a compound selected from the group consisting of metal sulfates, metal carboxylates and combinations thereof. In an embodiment, the activator comprises an aluminum carboxylate.

In an embodiment, the gelled organic-based fluid further comprises a delayed breaker. In an embodiment, the delayed breaker is encapsulated and comprises a encapsulated bicarbonate, urea or modified urea.

In an embodiment, the gelled fluid system is energized, e.g., a foam, a foam energized fluid, a mist, etc. As used herein, the term "energized fluid" refers to any stable mixture of gas phase and liquid phase, including foams, notwithstanding the foam quality value, i.e. the ratio of gas volume to the total volume of gas and liquid phases.

In an embodiment, the gelled fluid system further comprises an additive selected from proppants, beads, fibers and the like.

In an embodiment, there is provided a method relating to rheological modification of an organic-based fluid, comprising: preparing the organic-based fluid gel described herein; and breaking the gel, whereby the gel is broken at a faster rate than the similar fluid system sans the nitrogen compound under similar conditions.

In an embodiment, the method further comprises: introducing the gel into a wellbore penetrating a subterranean formation; and allowing the gel to contact a wellbore surface or the formation, wherein the breaking of the gel is effected after the formation contact. In an embodiment, the method further comprises a fracturing step wherein the introduction of the gel into the well is at a pressure above a fracturing pressure of the formation. In an embodiment, the method further comprises introducing proppant into the well.

In an embodiment, the method comprises cleanout of the well. In an embodiment, the method comprises coil tubing cleanout. In an embodiment, the method comprises a cleanout operation wherein the gelled fluid system comprises beads.

In an embodiment, a step of treating the well is selected from the group consisting of: cleanout of the well, cleanout of the pipeline, scale removal of the well, scale removal of the pipeline, solid removal of the well, solid removal of the pipeline, assisting solid transport of the well, assisting solid transport of the pipeline, assisting paraffin transport of the well, assisting paraffin transport of the pipeline, assisting asphaltene transport of the well, assisting asphaltene transport of the pipeline, fluid loss control of the well, fluid diversion of the well, and combinations thereof. The treating can be done with a coil tubing. Treating in one embodiment can be done without use of proppant.

Down-hole well applications include fracturing, sand-control, solids cleanout/transport, scale removal, chemical/viscous diversion, oilbase mud spacer/removal. Surface applications (on a pipeline) include pipeline pigging (formerly YFGO "jelly-pig", where solid-core or foam plugs were not practical) for solids/paraffin/asphaltene transport and removal within pipelines.

BRIEF DESCRIPTION OF THE DRAWING

The FIGURE shows viscosity profile at approximately 93° C. (200° F.) for viscoelastic surfactant-gelled oil samples made up of: diesel, phosphate ester crosslinking solution, aluminum triisopropanolate, and BET-E, with and without urea at different concentrations.

DETAILED DESCRIPTION

At the outset, it should be noted that in the development of any actual embodiments, numerous implementation-specific decisions must be made to achieve the developer's specific goals, such as compliance with system- and business-related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

Fluids and methods using fluids are based upon at least one organic base, such as a hydrocarbon fluid. As used herein, "organic solvent" includes, for example, any organic fluid medium suitable to facilitate ease of reaction and/or intermixing of the disclosed reactants, ease of handling of the disclosed reactants or resulting reaction products, and/or that may be optionally selected to be removable (e.g. by distillation) from a reaction product, following reaction. Organic solvents may be selected to have desired properties relative to the given reactants employed and may be chosen, for example, from any of the hydrocarbon or other organic fluids listed elsewhere herein as suitable for organic base fluids. When used, the hydrocarbon fluid comprises any known hydrocarbon liquid such as crude oil, refined or partially refined oil, fuel oil, liquefied gas, alkanes, alpha-olefins, internal olefins, diesel oil, condensates and combinations of hydrocarbons. In an embodiment the organic solvent is diesel, which is typically a mixture of aromatics and saturated and unsaturated aliphatics, and which may contain trace amounts of compounds containing oxygen, sulfur, and nitrogen. In other embodiments, diesel can be replaced with a number of other hydrocarbons and solvents: xylene, LPG, toluene, ether, ester, mineral oil, other petroleum distillates, vegetable oil, animal oil, bio-diesel, etc. As used herein, "fatty acid" is a carboxylic acid often with a long unbranched aliphatic tail chain. Fatty acids are aliphatic monocarboxylic acids derived from or contained in esterified form in an animal or vegetable fat, oil or wax. Aliphatics include alkanes (e.g. paraffin hydrocarbons), alkenes (e.g. ethylene) and alkynes (e.g. acetylene). Natural fatty acids commonly have a chain of 4 to 28 carbons (usually unbranched and even-numbered), which may be saturated or unsaturated.

The gelling agents used as crosslinker according to one embodiment are salts of carboxylic acids having from about 6 to about 30 carbon atoms, or from about 8 to about 20 carbon atoms.

These gelling agents may be prepared by heating the carboxylic acid with a multivalent metal compound. These metals can be divalent or trivalent, and may be complexed with anions including halides, hydroxides, sulfates, sulfonates, nitrates, carboxylates, and other oxo anions, and so forth. This can be accomplished in a ratio of about two or three carboxylic acid equivalents to one metal, and the salts formed are di- and tri-salts having the following general formula:

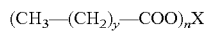

(CH$_3$—(CH$_2$)$_y$—COO)$_n$X wherein y is 6 to 28, or 6 to 18; n is 2 or 3; and X is a multivalent metal such as aluminum, boron, zinc, copper, iron, magnesium, calcium, barium, titanium, zirconium, tin, cobalt and so forth, and mixtures thereof, or a metal alkoxide, complexed to carboxylic acid groups. Aluminum can be one of the multivalent metals for use in the present embodiments. The resultant salts can be tri-salts having three carboxylic acid groups complexed to one metal, or the structure is a metal covalently bonded to an alkoxide group and two carboxylic acid groups.

Specific aluminum compounds useful herein include aluminum acetate, aluminum alkoxides including isopropoxide, aluminum sulfate, aluminum chloride, aluminum hydroxide and poly-oxo-aluminum compounds.

The carboxylic acids can be branched, and have from about 6 to about 30 carbon atoms. A branched carboxylic acid for use herein is 2-ethylhexanoic acid. Linear carboxylic acids may also be utilized in combination with the branched carboxylic acids of the present embodiments, a linear carboxylic acid being octanoic acid.

In one embodiment, the gelling agent is a di-ester or a tri-ester made with the same branched carboxylic acid. In this way, in a planar representation, the organometallic salt is symmetrical. In a particular embodiment, the gelling agent is hydroxyaluminium bis(2-ethylhexanoate) or aluminum 2-ethylhexanoate, or a combination of both. In a second embodiment, the gelling agent is a di-ester or a tri-ester made with different branched carboxylic acids.

The linear carboxylic acids are combined with a viscoelastic surfactant to gel sufficiently, or to have a sufficient increase in viscosity. The resultant combination is liquid. The fluid may also contain in another embodiment gel stabilizers, including but not limited to a source of basic aluminum such as sodium aluminate, aluminum alkoxides or aluminum acetate to assist in formation of the gel structure.

In one embodiment, an organic phosphate, for example, a phosphate ester, is used as a crosslinker with an activator. The metal salts of partially esterified phosphates are known as gelling agents from, for example, U.S. Pat. No. 4,877,894 which is incorporated herein by reference. Specific alkyl phosphate ester gelling agents include C$_3$-C$_{18}$ alkyl diester acids, or C$_6$-C$_{10}$ alkyl diester acids, or C$_8$-C$_{10}$ alkyl diester acids, mixtures thereof, and analogous mono and diesters. These additives are known in the industry, and many are commercially available. The gelled structure in the oil is developed by mixing the alkyl phosphate ester with an activator, such as, for example, a basic aluminum component such as sodium aluminate, selected aluminum alkoxides, aluminum acetate, and the like.

One method for making alkyl phosphate esters or diesters involves reacting aliphatic alcohols having from 3 to 18, or 6 to 10 carbon atoms with phosphorous pentoxide. The phosphate intermediate then may interchange its ester groups with triethyl phosphate with triethylphosphate producing a more broad distribution of alkyl phosphate esters.

A representative embodiment of a phosphate ester gelling agent comprises a mixture of 80 wt % of a mixture of ethyl, octyl and decyl esters of phosphoric acid, e.g., made from 15 wt % phosphoric anhydride, 25 wt % triethyl phosphate, and 60 wt % of approximately equal parts C$_8$ and C$_{10}$ linear fatty alcohols, and 20 wt % of a heavy aromatic solvent, which is about 75 wt % aromatics and 25 wt % paraffinic petroleum distillates. In one embodiment, the concentration of the phosphate ester mixture used ranges from about 6 to about 8 ml/L (about 6 to about 8 gallons per 1000 gallons (gpt)) base oil and the concentration of the aluminum carboxylate activator used ranges from about 1 to about 2.5 ml/L. The concentration of the phosphate ester mixture can be about 2.5 to 3.3 times the concentration of the activator in many cases, although this factor depends on the exact nature of the base oil and additives and on the stability of the additives. It is customary to avoid exceeding a ratio of 3.3 because it is known that there is often a dramatic and immediate break observed if the ratio is increased only slightly above about 3.3 to about 3.4.

The VES may be selected from the group consisting of cationic, anionic, zwitterionic, amphoteric, nonionic and combinations thereof. Some non-limiting examples are those cited in U.S. Pat. No. 6,435,277 and U.S. Pat. No. 6,703,352, each of which is incorporated herein by reference. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

Non-limiting examples of suitable viscoelastic surfactants useful for viscosifying some fluids include cationic surfactants, anionic surfactants, zwitterionic surfactants, amphoteric surfactants, nonionic surfactants, and combinations thereof.

In general, particularly suitable zwitterionic surfactants have the formula:

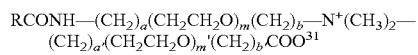

in which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and $CH_2CH_2O$ may also be $OCH_2CH_2$.

In an embodiment, a zwitterionic surfactant of the family of betaine is used. Two suitable examples of betaines are BET-O and BET-E. The surfactant in BET-O-30 is shown below; one chemical name is oleylamidopropyl betaine.

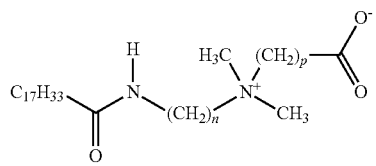

Surfactant in BET-O-30
(when n = 3 and p = 1)

It is designated BET-O-30 because as obtained from the supplier (Rhodia, Inc. Cranbury, N.J., U.S.A.) it is called Mirataine BET-O-30 because it contains an oleyl acid amide group (including a $C_{17}H_{33}$ alkene tail group) and contains about 30% active surfactant; the remainder is substantially water, sodium chloride, and propylene glycol. An analogous material, BET-E-40, is also available from Rhodia and contains an erucic acid amide group (including a $C_{21}H_{41}$ alkene tail group) and is approximately 40% active ingredient, with the remainder being substantially water, sodium chloride, and isopropanol.

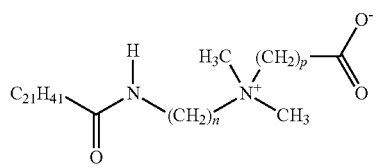

Surfactant in BET-E-40
(when n = 3 and p = 1)

VES systems, in particular BET-E-40, may also optionally contain performance enhancers, such as viscosity enhancers, for example polysulfonates, for example polysulfonic acids, for example about 1% of a condensation product of a naphthalene sulfonic acid, for example sodium polynaphthalene sulfonate, as a rheology modifier, as described in U.S. Pat. No. 7,084,095 which is hereby incorporated by reference. The surfactant in BET-E-40 is also shown below; one chemical name is erucylamidopropyl betaine. As-received concentrates of BET-E-40 were used in the experiments reported below, and are referred to as "VES." BET surfactants, and other VES's that are suitable, are described in U.S. Pat. No. 6,258,859.

Co-surfactants may be useful in extending the brine tolerance, and to increase the gel strength and to reduce the shear sensitivity of the VES-fluid, in particular for BET-O-type surfactants. An example given in U.S. Pat. No. 6,258,859 is sodium dodecylbenzene sulfonate (SDBS), also shown below.

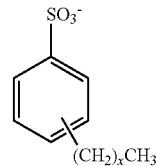

SDBS
(when x = 11 and the counter-ion is $Na^+$)

Other suitable co-surfactants include, for example those having the SDBS-like structure in which x=5-15; co-surfactants are those in which x=7-15. Still other suitable co-surfactants for BET-O-30 are certain chelating agents such as trisodium hydroxyethylethylenediamine triacetate. The rheology enhancers may be used with viscoelastic surfactant fluid systems that contain such additives as co-surfactants, organic acids, organic acid salts, and/or inorganic salts. Some embodiments use betaines; e.g. BET-E-40. Although experiments have not been performed, it is believed that mixtures of betaines, especially BET-E-40, with other surfactants are also suitable.

Other betaines that are suitable include those in which the alkene side chain (tail group) contains 17-23 carbon atoms (not counting the carbonyl carbon atom) which may be branched or straight chained and which may be saturated or unsaturated, n=2-10, and p=1-5, and mixtures of these compounds. Some betaines are those in which the alkene side chain contains 17-21 carbon atoms (not counting the carbonyl carbon atom) which may be branched or straight chained and which may be saturated or unsaturated, n=3-5, and p=1-3, and mixtures of these compounds. These surfactants are used at a concentration of about 0.5 to about 10%, or from about 1 to about 5%, and or from about 1.5 to about 4.5%.

Exemplary cationic viscoelastic surfactants include the amine salts and quaternary amine salts disclosed in U.S. Pat. No. 5,979,557 and U.S. Pat. No. 6,435,277 which are hereby incorporated herein by reference. Examples of suitable cationic viscoelastic surfactants include cationic surfactants having the structure:

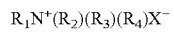

in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4)$ $X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available VES surfactant concentrate formulations, for example cationic VES surfactant formulations, may also optionally contain one or more members of the group consisting of alcohols, glycols, organic salts, chelating agents, solvents, mutual solvents, organic acids, organic acid salts, inorganic salts, oligomers, polymers, co-polymers, and mixtures of these members.

Another suitable cationic VES is erucyl bis(2-hydroxyethyl)methyl ammonium chloride, also known as (Z)-13 docosenyl-N—N— bis(2-hydroxyethyl)methyl ammonium chloride. It is commonly obtained from manufacturers as a mixture containing about 60 weight percent surfactant in a mixture of isopropanol, ethylene glycol, and water. Other suitable amine salts and quaternary amine salts include (either alone or in combination), erucyl trimethyl ammonium chloride; N-methyl-N,N-bis(2-hydroxyethyl) rapeseed ammonium chloride; oleyl methyl bis(hydroxyethyl) ammonium chloride; erucylamidopropyltrimethylamine chloride, octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris (hydroxyethyl) ammonium bromide; hexadecyl ethyl bis(hydroxyethyl) ammonium chloride; hexadecyl isopropyl bis (hydroxyethyl) ammonium iodide; and cetylamino, N-octadecyl pyridinium chloride.

Many fluids made with viscoelastic surfactant systems, for example those containing cationic surfactants having structures similar to that of erucyl bis(2-hydroxyethyl)methyl ammonium chloride, inherently have short re-heal times and the rheology enhancers may not be needed except under special circumstances, for example at very low temperature.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Pat. No. 6,239,183; U.S. Pat. No. 6,506,710; U.S. Pat. No. 7,060,661; U.S. Pat. No. 7,303,018; and U.S. Pat. No. 7,510,009 for example amidoamine oxides. These references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

The viscoelastic surfactant system may also be based upon any suitable anionic surfactant. In one embodiment, the anionic surfactant comprises an alpha-olefin sulfonate, e.g. ammonium or alkali metal alpha-olefin sulfonate. The alpha-olefin sulfonate may be derived from an alpha-olefin having, for example, from 3 to 40 carbon atoms and having from 10 to 22 carbon atoms. The alpha-olefin sulfonate may be ammonium, sodium or potassium alpha-olefin sulfonate and the like. A sodium alpha-olefin sulfonate solution is available under the tradename WITCONATE AOS. Other examples of alpha-olefin sulfonates are commercially available under the tradenames BIO-TERGE, POLYSTEP, STEPANTAN, and CALSOFT AOS.

In some embodiments, the anionic surfactant is an alkyl sarcosinate. The alkyl sarcosinate can generally have any number of carbon atoms. Alkyl sarcosinates have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms. Alkyl sarcosinate is represented by the chemical formula:

wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

The gel also typically contains proppants. The selection of a proppant involves many compromises imposed by economical and practical considerations. Criteria for selecting the proppant type, size, and concentration is based on the needed dimensionless conductivity, and can be selected by a skilled artisan. Such proppants can be natural or synthetic (including but not limited to glass beads, ceramic beads, sand, and bauxite), coated, or contain chemicals; more than one can be used sequentially or in mixtures of different sizes or different materials. The proppant may be resin coated, for e.g. pre-cured resin coated, provided that the resin and any other chemicals that might be released from the coating or come in contact with the other chemicals are compatible with them. Proppants and gravels in the same or different wells or treatments can be the same material and/or the same size as one another and the term "proppant" is intended to include gravel in this discussion. In general the proppant used will have an average particle size of from about 0.15 mm to about 2.39 mm (about 8 to about 100 U.S. mesh), more particularly, but not limited to 0.25 to 0.43 mm (40/60 mesh), 0.43 to 0.84 mm (20/40 mesh), 0.84 to 1.19 mm (16/20), 0.84 to 1.68 mm (12/20 mesh) and 0.84 to 2.39 mm (8/20 mesh) sized materials. Normally the proppant will be present in the slurry in a concentration of from about 0.12 to about 0.96 kg/L, or from about 0.12 to about 0.72 kg/L, or from about 0.12 to about 0.54 kg/L. The fluid may also contain other enhancers or additives.

In some embodiments, the gelled fluid further comprises another breaker selected from the group consisting of oxidative breakers, enzymes, pH modifiers, metal chelators, metal complexors, polymer hydrolysis enhancers, and micelle disturbing substances. Any breaker material suitable for reducing viscosity of the disclosed gels may be employed. Examples include calcined magnesium oxide and tetraethylenepentamine. The breaker may be solid or liquid. The breaker may be encapsulated. The breaker can include delay breaker or impregnated breaker. Examples of alkaline pH modifiers that can be used to cause emulsion destabilization include alkali metal hydroxides, oxides, phosphates, carbonates and bicarbonates; alkaline earth oxides, phosphates, and carbonates; ammonium hydroxide, ammonium carbonate, and ammonium bicarbonate; alkali metal silicates, and base precursors such as ureas and substituted ureas, cyanates, alkylamines and certain alkanolamines, quaternary ammonium salts, ammonium salts and salts of a weak acid and a strong base, among others. In a particular embodiment, the breaker is ammonium bicarbonate.

In some embodiments, the use of partial monoesters of styrene maleic anhydride copolymers and fatty alcohols ("MSMA's"), as disclosed in U.S. Pat. No. 6,849,581, incorporated herein by reference thereto, are not necessary for greatly enhanced rheology performance, but may be useful in some other embodiments. When used, many of such MSMA-based compounds are available in solid resin form and may be first dissolved in an organic solvent (e.g., xylene, toluene, or any solvent capable of dissolution of the MSMA-based compound) in any suitable amount (e.g., from about 1% to about 50%) MSMA-based compound by weight of organic solvent solution. The MSMA-based compound/solvent solution may then be combined in any suitable manner with other components. For example, a metal source, such as aluminum isopropoxide may be directly combined with the MSMA-based compound/solvent solution and heated (if necessary) to form a gelled fluid. Alternatively the MSMA-based compound/solvent solution may be combined with at least one fatty acid and at least one metal source, and heated (if necessary) to form a gelled fluid. In some embodiments, an additional metal source may be "back added" following initial combination of ingredients, if so desired; however, in many embodiments, such additional metal sources are not required.

In an embodiment, the oil-based gelled system is used for sand cleanout in water sensitive formations. A particular embodiment is coil tubing cleanout. In the prior art, aqueous linear polymer gels and foams are generally used for sand cleanout. Crosslinked fluids are not often used because of their high viscosity; for best cleanout performance, fluids should be in turbulent flow when pumped, which translates into high flow rates at which friction pressures of very viscous fluids would be excessive. Gelled oils are used in coiled tubing cleanout applications in water sensitive formations. Because of the low sand suspension capabilities of gelled oil systems, however, high flow rates are needed to clean out sand. When pumping at high rates, foaming of the fluid is often recommended. Gelled oils are difficult to foam, often requiring fluorinated compounds that are not environmental friendly as surfactants. In addition, friction losses with conventional gelled oil fluids are generally higher than with water-based fluids, especially in turbulent flow.

The fluid system in this embodiment has exceptionally high solids suspension characteristics compared to conventional gelled oils. The system can be batch-mixed or continuous-mixed ("pumped on the fly") as diesel slurry. The application temperature range in one embodiment is up to 149° C. (300° F.). In embodiments, the features and benefits of the present gelled oil system can also include: lower additive concentrations compared to other gelled oil systems; adequate and consistent sand suspension without using any foaming agent; the capability to be energized without any other additional additives; operational simplicity due to the use of a single fluid formulation for the entire cleanup stage; a higher low shear viscosity relative to other gelled oil systems can decrease susceptibility to leakoff into the formation and thus eliminate the need for a separate leakoff control additive; less sensitivity to the type of diesel relative to other oil-gelling systems; and robustness compared to traditional gelled oil systems owing to less sensitivity to the ratio of gelling agent to activator concentration.

In one typical embodiment of coiled tubing ("CT") cleanout with the present gelled hydrocarbon fluid, the well is completed with perforated tubing, and solids must be cleaned out from the tubing in the vicinity of the perforations. Coiled tubing with a smaller diameter than the perforated tubing is filled with diesel and run in hole without circulating. The well is then opened to flow, for example, at about 0.69 MPa (100 psig) above the trunkline pressure; washing the fill is started while advancing the CT and circulating diesel to a depth, for example, about 15.2 m (50 feet) below the top of the fill; the tubing is pulled to, for example, about 6.1 m (20 feet) above the perforations; and diesel circulation is stopped and the well is shut in, for example, for about 30 minutes. The CT is run in without circulating to, for example, about 3 meters (about 10 feet) above the fill; the well is opened, and about 3785 liters (about 1000 gallons) conventional gelled oil followed by circulation of about 1892 liters (about 500 gallons) of, for example, urea-VES gelled oil according to an embodiment, foamed with nitrogen, while moving the CT up and down about every 7.6 m (25 feet) to prevent sand settling and the CT becoming stuck. The conventional and urea-VES gelled oil steps are repeated in alternation, optionally with the conventional gelled oil also foamed, until no sand is recovered over the interval to be cleaned; then diesel containing additional breaker is circulated; then the CT is pulled out of the hole while circulating diesel.

In another typical embodiment, the CT reciprocation can be omitted because the excellent sand carrying capacity of the urea-VES gelled oil is adequate to lift the solids to the surface. In another embodiment, the flushes with conventional gelled oil are eliminated and only urea-VES gelled oil is used. In a further embodiment with or without the conventional gelled oil flushes, the urea-VES gelled oil is neat, i.e., not foamed or otherwise energized, allowing for even greater operational simplicity.

Additional embodiments of methods of use of the fluids include use in a wellbore for fracturing operations, where the gelled hydrocarbon fluid is pumped in from the mixing tanks and into the well bore at a desired fracturing pressure. The fluid is pumped into the formation fractures, and once the fracturing operation is completed, the pressure is released.

The method of forming the gel can be used as a method of accelerating gelled-hydrocarbon viscosity development, i.e. where continuous-mixing processes are preferred, irrespective of application. Currently aluminum octoate/octanoate systems are used for many other purposes, but require residence time to form a gel structure.

The present method is also suitable for gravel packing, or for fracturing and gravel packing in one operation (called, for example frac and pack, frac-n-pack, frac-pack, StimPac treatments, or other names), which are also used extensively to stimulate the production of hydrocarbons, water and other fluids from subterranean formations. These operations involve pumping a slurry of "proppant" (natural or synthetic materials that prop open a fracture after it is created) in hydraulic fracturing or "gravel" in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore.

Gravel is also a natural or synthetic material, which may be identical to, or different from, proppant. Gravel packing is used for "sand" control. Sand is the name given to any particulate material from the formation, such as clays, that could be carried into production equipment. Gravel packing is a sand-control method used to prevent production of formation sand, in which, for example a steel screen is placed in the wellbore and the surrounding annulus is packed with prepared gravel of a specific size designed to prevent the passage of formation sand that could foul subterranean or surface equipment and reduce flows. The primary objective of gravel packing is to stabilize the formation while causing minimal impairment to well productivity. Sometimes gravel packing is done without a screen. High permeability formations are frequently poorly consolidated, so that sand control is needed; they may also be damaged, so that fracturing is also needed. Therefore, hydraulic fracturing treatments in which short, wide fractures are wanted are often combined in a single continuous ("frac and pack") operation with gravel packing. For simplicity, in the following we may refer to any one of hydraulic fracturing, fracturing and gravel packing in one operation (frac and pack), or gravel packing, and mean them all.

Any additives normally used in well treatment fluids can be included, again provided that they are compatible with the other components and the desired results of the treatment. Such additives can include, but are not limited to breakers, anti-oxidants, crosslinkers, corrosion inhibitors, delay agents, biocides, buffers, fluid loss additives, pH control agents, solid acids, solid acid precursors, etc. The wellbores treated can be vertical, deviated or horizontal. They can be completed with casing and perforations or open hole.

EXAMPLES

Example 1

Representative diesel gels with phosphate ester, an aluminum activator complex, viscoelastic surfactant and 0 or one of various concentrations of urea were investigated. The diesel was red, low sulfur diesel. The phosphate ester was a mixture of 80 wt % of a mixture of ethyl, octyl and decyl esters of phosphoric acid, made from 15 wt % phosphoric anhydride, 25 wt % triethyl phosphate and 60 wt % of approximately equal parts $C_8$ and $C_{10}$ linear fatty alcohols, and 20 wt % of a heavy aromatic solvent, which is about 75 wt % aromatics and 25 wt % paraffinic petroleum distillates. The aluminum activator complex was a mixture of about 24 wt % 2-ethylhexan-1-ol and 59 wt % aluminum triisopropanolate in diesel oil. The VES was a mixture of about 39 wt % erucic amidopropyl dimethyl betaine, 22 wt % isopropanol and 5 wt % sodium chloride in water (BET-E-40). All amounts given are for as-received materials, except that the VES amounts are for a mixture 50/50 by weight BET-E-40 with methanol.

In exemplary embodiments of commercial urea-VES gelled oils, the concentration of phosphate ester solution ranges from about 1 to about 16 ml per L of base oil (about 1 to about 16 gallons per 1000 gallons (gpt)), or about 1 to 10 ml/L (about 1 to 10 gpt); of aluminum activator complex solution about 0.5 to 8 ml/L (about 0.5 to 8 gpt), or about 1 to 6 ml/L (about 1 to 6 gpt); and of BET-E solution about 0.25 to 20 ml/L (about 0.25 to 20 gpt), or about 1 to 5 ml/L (1 to 5 gpt). In this example, the concentrations were set at 8 ml/L (8 gpt) phosphate ester solution, 2.4 ml/L (2.4 gpt) aluminum activator complex solution, 5 ml/L (5 gpt) BET-E/methanol solution, and 0, 0.12, 0.6, 1.2 or 2.4 g urea per liter of base oil (0, 1, 5, 10 or 20 pounds per thousand gallons (ppt)).

The gelled oil samples were prepared in a kitchen blender at 500 rpm for 15 minutes. Viscosity curves were obtained in a FANN 35 rheometer with a heating cup at about 93° C. (200° F.) and a shear rate of 100/s following the API RP 39 procedure. The results are shown in FIG. 1. The initial steady state viscosity of the system without the urea additive is around 600 MPa-s (600 cp) at 100/s. At 0.12 g/L (1 ppt) the urea increased viscosity to about 700 MPa-s (700 cp) and the gel did not break after 4 hours in the rheometer; however, it did break over 10 hours at 93° C. (200° F.) in a bottle test. Both 0.6 and 1.2 g/L urea increased the initial steady state viscosity 750 to 850 MPa-s (750 to 850 cp), which would assist in the transport of solids, and the viscosity of both samples broke on continued exposure to the 93° C. (200° F.) test temperature. Higher loading at 2.4 g/L (20 ppt) increased initial viscosity for a relatively short but useful period and broke the viscosity in less than 1 hour.

Example 2

Phosphorous-free diesel gels are prepared with aluminum diester and triester compounds, VES and between 0.06 and 0.24 wt % urea based on the weight of the base oil. The aluminum diester is hydroxyaluminum bis(2-ethylhexanoate), CAS#30745-55-2, at a loading of 14.4 g/L base oil (120 ppt); and the triester, aluminum 2-ethylhexanoate, CAS#3002-63-9, 1.2 g/L (10 ppt). The VES is BET-E-40 50/50 in methanol as in Example 1, at 3 vol %.

The gelled oil samples are prepared in a WARING blender at 4000 rpm for 3-5 minutes. Viscosity curves are obtained in a FANN 50 rheometer with a heating cup at about 100° C. (212° F.) and a shear rate of 100/s following the API RP 39 procedure. As the urea is added at the lower concentration (0.06 wt %), the initial (15 minute) viscosity begins to increase relative to the no-urea baseline gel, but there may be no breaking activity imparted to the system. As the urea concentration is increased, both initial viscosity and a breaking effect are seen. As the urea concentration approaches the higher urea loading (0.24 wt %), the fluid is broken almost immediately and the urea loading is too high to obtain an initial viscosity-boosting effect. This example illustrates the importance of selecting a urea loading for the oil-based gel system at which both an initial viscosity increase and a breaking effect are obtained.

It is clear that the present invention is well adapted to carry out its objectives and attain the ends and advantages mentioned above as well as those inherent therein. While presently embodiments of the invention have been described in varying detail for purposes of disclosure, it will be understood that numerous changes may be made which will readily suggest themselves to those skilled in the art and which are encompassed within the spirit of the invention disclosed and as defined in the written description and appended claims.

What is claimed is:

1. A method, comprising:
    forming a gellable organic-based fluid system comprising a viscoelastic surfactant;

dissolving a low molecular weight nitrogen compound in the fluid system, wherein the nitrogen compound is selected from the group consisting of, thiourea, guanidine and mixtures thereof, wherein the nitrogen compound is present in the fluid system in an amount and a form effective to increase initial viscosity of the fluid system at 100/s and reduce break time of the fluid system, relative to the fluid system without the nitrogen compound; and gelling the fluid system, whereby the gelled fluid system has a greater viscosity at 100/s upon initial gel formation and is subject to breaking at a faster rate, relative to a similar fluid system sans the low molecular weight nitrogen compound; and breaking the gel, whereby the gel is broken at a faster rate than the similar fluid system without the nitrogen compound under similar conditions.

2. The method of claim 1, further comprising:
introducing the gel into a wellbore penetrating a subterranean formation; and
allowing the gel to contact the wellbore surface or the formation.

3. The method of claim 1, further comprising a fracturing step wherein the introduction of the gel into the well is at a pressure above a fracturing pressure of the formation.

4. The method of claim 1, further comprising introducing proppant into the well.

5. The method of claim 1, comprising cleanout of the well.

6. The method of claim 1, comprising coil tubing cleanout.

7. The method of claim 1, comprising cleanout wherein the gelled fluid system comprises beads.

8. The method of claim 1, wherein the gellable organic-based fluid system comprises an organic liquid selected from the group consisting of diesel oil, kerosene, paraffinic oil, crude oil, refined oil, gas condensates, liquefied petroleum gas (LPG), toluene, xylene, ethers, esters, mineral oil, biodiesel, vegetable oil, animal oil, alcohol, and mixtures thereof.

9. The method of claim 1, wherein the gellable organic-based fluid system comprises an external organic liquid phase.

10. The method of claim 1, wherein the viscoelastic surfactant is selected from the group consisting of cationic surfactants, anionic surfactants, zwitterionic surfactants, amphoteric surfactants, nonionic surfactants and combinations thereof.

11. The method of claim 1, wherein the viscoelastic surfactant comprises a quaternary amine having the formula:

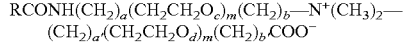

in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; c and d are independently 0 or 1 and when c or d are 1, $CH_2CH_2O$ may also be $OCH_2CH_2$.

12. The method of claim 1, wherein the viscoelastic surfactant comprises a betaine compound selected from the group consisting of erucic amidopropyl dimethyl betaine, oleoylamidopropyl dimethyl betaine, cocamidopropyl betaine, olefin sulfonate and mixtures thereof.

13. The method of claim 1, wherein the viscoelastic surfactant comprises an alpha-olefin sulfonate.

14. The method of claim 1, wherein the viscoelastic surfactant is present in the gellable fluid system in a concentration range of from 0.02 to 2.0 volume percent.

15. The method of claim 1, wherein the nitrogen compound is dissolved in the fluid system at between 0.01 and 25 g/L.

16. The method of claim 1, wherein the fluid system is gelled with a metal carboxylate crosslinker.

17. The method of claim 16, wherein the metal carboxylate crosslinker is branched and at least one carboxylate branch has from about 6 to about 30 carbon atoms.

18. The method of claim 16, wherein the metal carboxylate crosslinker is selected from the group consisting of: di-ester with the same branched carboxylic acid, tri-ester with the same branched carboxylic acid and mixtures thereof.

19. The method of claim 16, wherein the metal carboxylate crosslinker is an aluminum carboxylate crosslinker.

20. The method of claim 16, wherein the metal carboxylate crosslinker is selected from the group consisting of aluminum 2-ethylhexanoate, hydroxyaluminum bis(2-ethylhexanoate), and mixtures thereof.

21. The method of claim 16, wherein the gelled fluid system is free of any added phosphorus source.

22. The method of claim 1, wherein the gellable fluid system comprises an organic phosphate and an activator.

23. The method of claim 22, wherein the organic phosphate is selected from the group consisting of phosphate esters and the activator comprises a compound selected from the group consisting of metal sulfates, metal carboxylates and combinations thereof.

24. The method of claim 22, wherein the activator comprises an aluminum carboxylate.

25. The method of claim 1, wherein the gelled organic-based fluid further comprises a delayed breaker.

26. The method of claim 1, wherein the gelled fluid system is energized, foamed or a mist.

27. The method of claim 1, further comprising an additive selected from the group consisting of proppants, beads, fibers and combinations thereof.

* * * * *